United States Patent [19]

Takeyama et al.

[11] Patent Number: 4,923,942

[45] Date of Patent: May 8, 1990

[54] OPTICAL DISC AND METHOD OF MANUFACTURING THE SAME

[75] Inventors: Tadao Takeyama; Mitsutoshi Aritomi, both of Ami, Japan

[73] Assignee: Mitsubishi Petrochemical Company, Ltd., Tokyo, Japan

[21] Appl. No.: 251,999

[22] Filed: Sep. 30, 1988

Related U.S. Application Data

[63] Continuation of Ser. No. 31,674, Mar. 30, 1987, abandoned.

[30] Foreign Application Priority Data

Mar. 28, 1986 [JP] Japan .................................. 61-70347

[51] Int. Cl.$^5$ .............................................. C08F 32/08
[52] U.S. Cl. ...................................... 526/282; 526/75; 526/281; 346/137
[58] Field of Search .......................... 526/75, 282, 281; 264/1.1; 369/288; 346/137

[56] References Cited

U.S. PATENT DOCUMENTS

| | | | |
|---|---|---|---|
| 3,240,767 | 3/1966 | Caldwell et al. | 526/281 X |
| 3,271,374 | 9/1966 | Caldwell et al. | 526/281 X |
| 3,661,869 | 5/1972 | Greco et al. | 526/281 |
| 3,923,740 | 12/1975 | Schmitt et al. | 526/313 X |
| 3,925,333 | 12/1975 | Valvassori et al. | 526/281 X |
| 4,131,729 | 12/1978 | Shmitt et al. | 526/282 |
| 4,172,951 | 10/1979 | Gruber et al. | 526/282 |
| 4,540,723 | 9/1985 | Ying | 523/115 |

FOREIGN PATENT DOCUMENTS

| | | | |
|---|---|---|---|
| 0152515 | 8/1985 | Japan | 526/282 |
| 0226513 | 11/1985 | Japan | 526/281 |

OTHER PUBLICATIONS

English Translation of Japanese Kokai Pub'n No.: 61-287913 to Aritomi et al., published. 12-18-86.
Hackh's Chem. Dict., J. Grant (ed.) McGraw-Hill, Inc., p. 27 (1969).

*Primary Examiner*—Joseph L. Schofer
*Assistant Examiner*—F. M. Teskin
*Attorney, Agent, or Firm*—Oblon, Spivak, McClelland, Maier & Neustadt

[57] ABSTRACT

An optical resin consisting essentially of a radical polymerization polymer of an ethylenically unsaturated monomer, characterized in that at least a major part of the ethlenically unsaturated monomer is an ester of 1 mole of tricyclo[5,2,1,0$^{2,6}$]decanedimethanol with 2 moles of a mixture of acrylic acid and metharcylic acid. Because the resin is a polymer obtained from the restricted monomer as specified above, the resin possesses high thermal resistance and high heat stability as well as low hygroscopic property. Dimethanol compounds from higher Diels-Alder adducts of cyclopentadine are also used in place of the tricyclo [5,2,1,0$^{2,6}$]decanedimthanol which is a Diels-Alder adduct of two moles of cyclopentadiene.

21 Claims, 4 Drawing Sheets

OPTICAL DISC AND METHOD OF MANUFACTURING THE SAME

This application is a continuation of application Ser. No. 07/331,674 filed on Mar. 30, 1987, now abandoned.

BACKGROUND OF THE INVENTION

1. Field of the Invention

This invention relates to resin materials consisting essentially of radical polymers of ethylenically unsaturated monomers. More specifically, this invention relates to resin materials characterized mainly by the ethylenically unsaturated monomers to be polymerized into the resin materials.

Recently, various optical devices have been developed and remarkable developments are being achieved in the field of information processing. Some of such devices utilize discs (e.g., videodiscs, memory discs, and digital audiodiscs) for optically storing information therein.

For example, optical discs are expected to be widely used practically for recording and reproducing images and sounds, memory and reproduction of a large amount of information and the like because such optical discs exhibit many characteristics such as markedly high recording density and excellent images and sounds reproduced therefrom and the like.

2. Description of the Prior Art

The above mentioned discs are being produced from various materials. However, such materials have both merits and demerits, and it can be said that materials that are fully satisfactory for discs have not yet been proposed.

That is, for example, with respect to memory discs, inorganic glass and polymethylmethacrylate resin are practically used as the disc materials. Inorganic glass as a disc material, however, is disadvantageous in that it is heavy and fragile, costly for its precise processing and the like, although it is moisture-proof, and thus moisture has little adverse effects on a recording layer. On the other hand, polymethylmethacrylate resin materials are less fragile than the inorganic glass and are lower in cost, but have fatal defects as materials for optical devices in that they have low heat resistance and high hygroscopicity. Thus, the resulting discs warp so easily that an objective lens in a recording-reproducing optical system becomes out of focus owing to the warp and causes errors in operation.

Approaches for solving the Problems

The above described problems noted in the polymethylmethacrylate resin are substantially solved by the resins we have developed.

These resins are radical polymers of di(meth) acrylate of tricyclo[5,2,1,0$^{2,6}$]decanedimethanol(Japanese Patent Application Nos. 12686/85 and 131237/85).

The polymers produced by radical polymerization of this specified diethylenically unsaturated monomer are largely improved in heat-resistance, hygroscopicity and mechanical properties and the discs made from these resins are substantially satisfactory in the above mentioned properties.

However, with the advance of technology, higher performances of resin disc materials have been urgently demanded. If further improvement can be made in the above described resin materials, the resulting materials will become further useful.

From such a viewpoint, possible improvements in the above described resin materials are to enhance both heat resistance and thermal stability. More specifically, the resins obtained from di(meth)acrylates of this specified dimethanol compound have amply high heat-resistant characteristics. However, the features of the heat-resistant characteristics vary depending upon the kind of the carboxylic acid moiety in these di(meth)acrylates. That is, the resin obtained from the bismethacrylate has very high heat resistance but does not have a very high thermal stability, whereas the resin obtained from the bisacrylate has very high thermal stability but not a high heat resistance. Therefore, needless to say, it is desirable to provide a resin with both the heat resistance inherent in the resin obtained from the bismethacrylate and the thermal stability inherent in the resin obtained from the bisacrylate.

It is to be noted that heat resistance is a factor which controls thermal-resistant shape retention property generally indicated by a heat deformation temperature. On the other hand, thermal stability is a decomposition resistance indicated by the temperature at which loss in weight starts owing to the decomposition by high-temperature heating and is a factor which controls resistances against quality deteriorations such as discoloration of resins, deterioration in characteristics of optical devices, etc.

SUMMARY OF THE INVENTION

An object of the present invention is to provide resin materials which are not accompanied by the above described problems. This object can be achieved by using, as the above mentioned di(meth)acrylate, those prepared by a specific method.

More specifically, the optical resin material according to the present invention consists essentially of a radical polymer of an ethylenically unsaturated monomer and is characterized in that at least a major part of the ethylenically unsaturated monomer is an ester of 1 mole of tricyclo[5,2,1,0$^{2,6}$]decanedimethanol with 2 moles of a mixture of acrylic acid and methacrylic acid.

According to the present invention, the specific di(meth)acrylates of the dimethanol compound are enhanced both in heat resistance and thermal stability in addition to their inherent good moisture-proof property and mechanical properties.

These specific diethylenically unsaturated monomers are considered to be a mixture of bisacrylate, bismethacrylate and mixed methacrylate/acrylate in view of the method for preparation thereof and the results of instrumental analysis thereof. However, it was quite unexpected that the resin obtained from the monomers is improved in both heat resistance and thermal stability, in view of the fact that bisacrylate and bismethacrylate are not sufficiently satisfactory with respect to either heat resistance or thermal stability and the fact that a mixture thereof does not increase heat resistance because the properties of the resulting resin are largely influenced by bisacrylate moiety (refer to the comparative examples given hereinafter).

Figure 2:
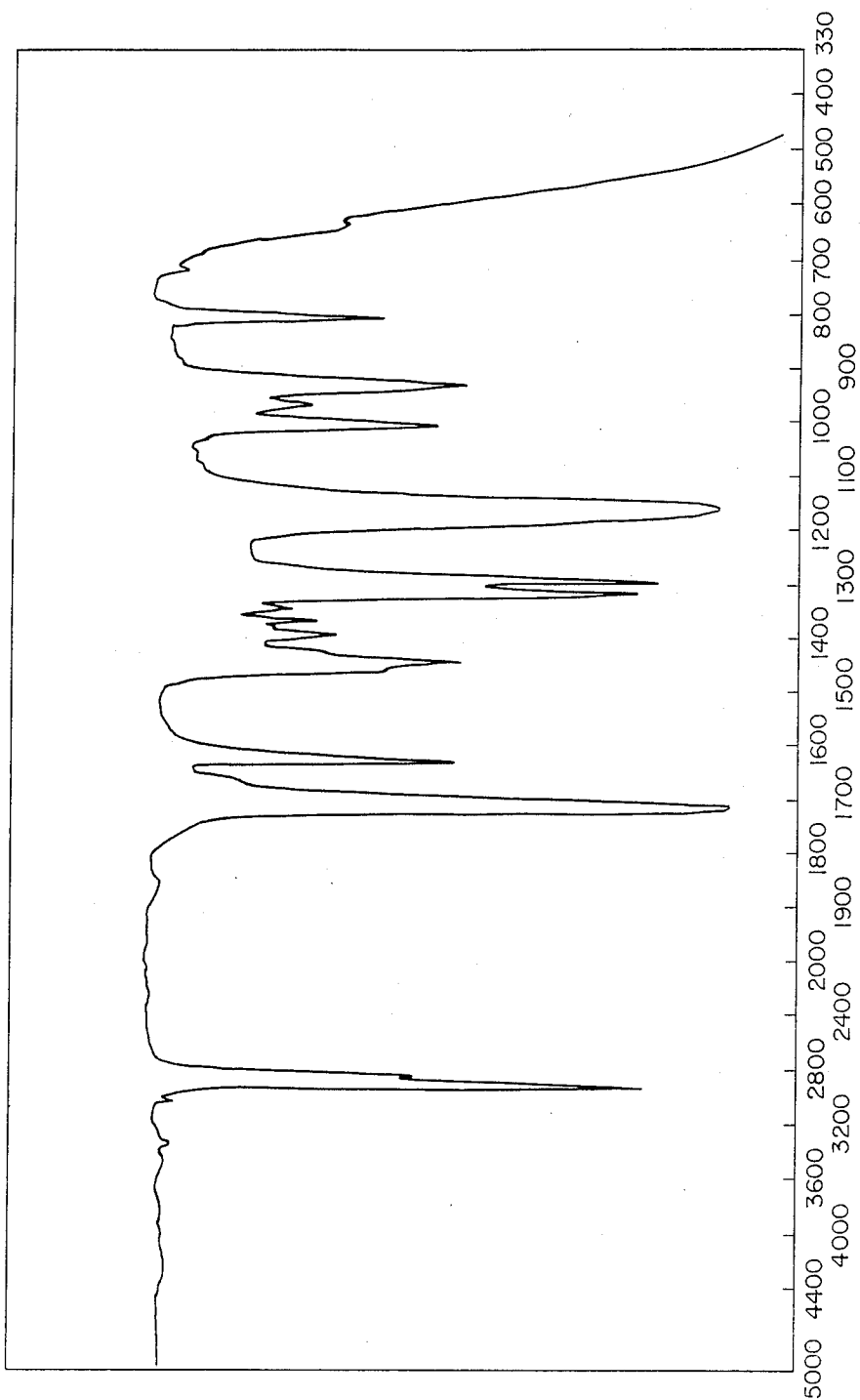
Figure 3:
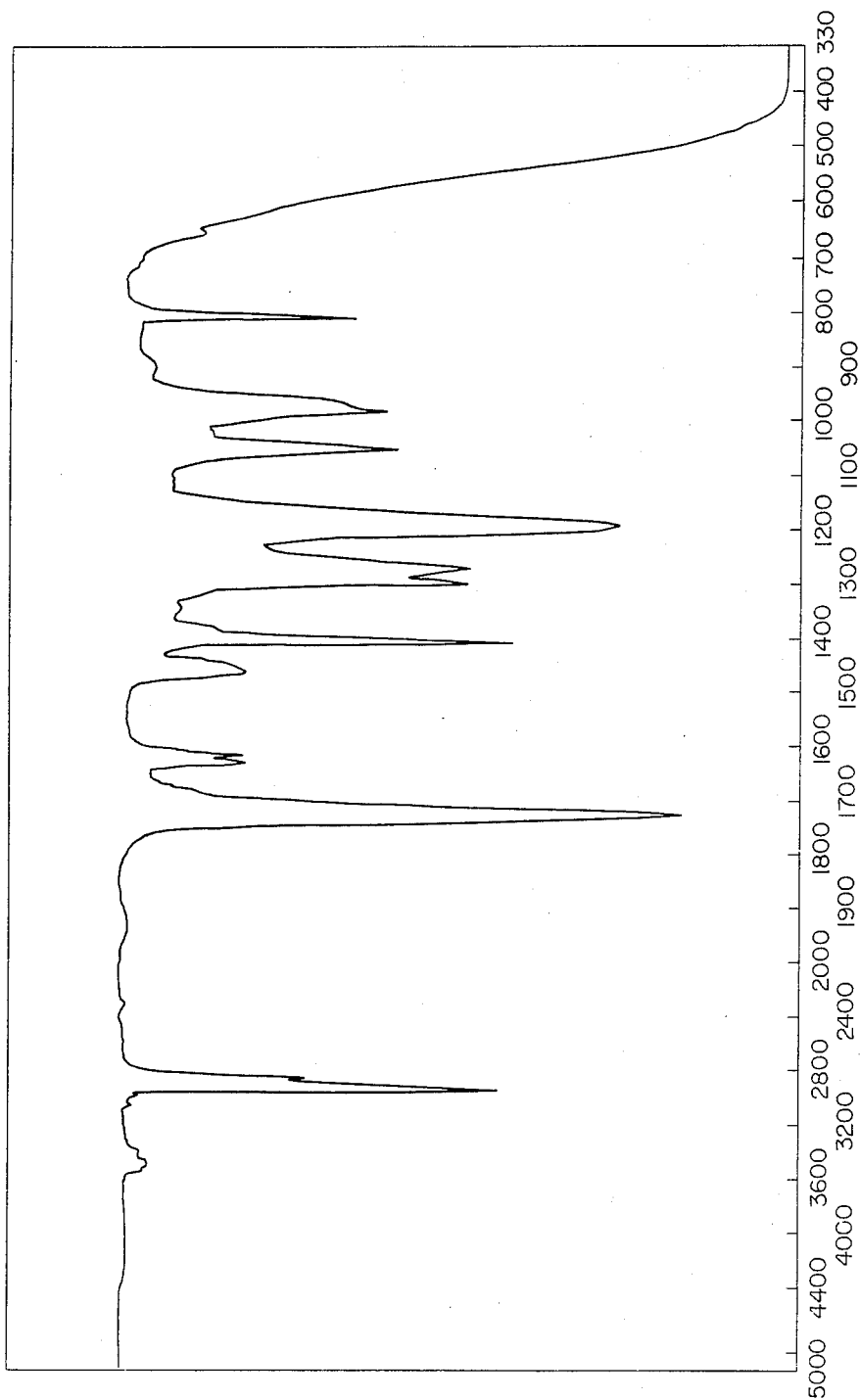
Figure 4:
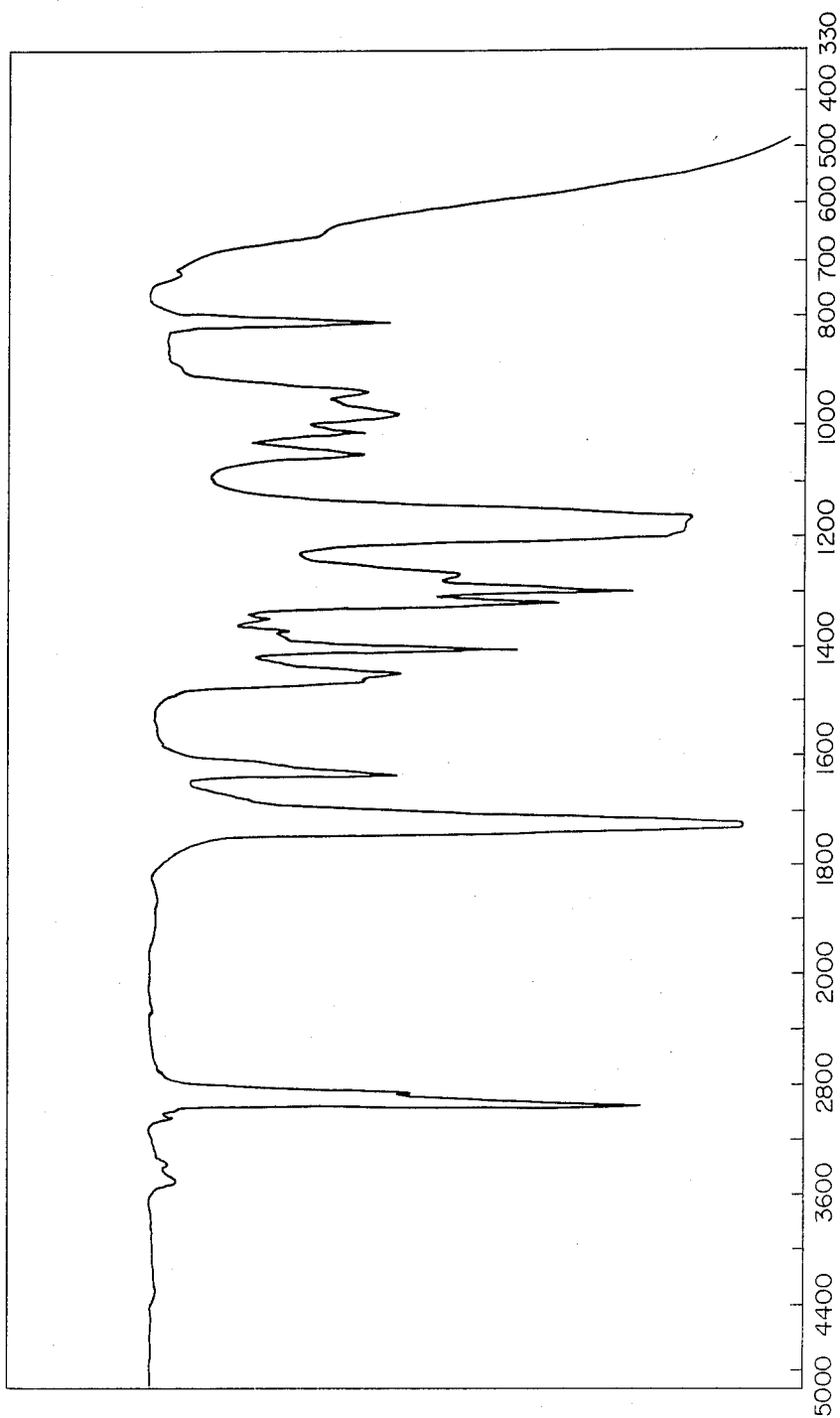

FIGS. 2 through 4 are infrared absorption spectrums respectively of the above mentioned three kinds of the compounds, wherein FIG. 2 corresponds to bismethacrylate (Comparative Example 1), FIG. 3 corresponds to bisacrylate (Comparative Example 2), and FIG. 4 corresponds to the meth/acrylate (Example 1) according to the present invention.

DETAILED DESCRIPTION OF THE INVENTION

Monomers

Details of the Monomers

The monomers which constitute the unique features of the present invention are obtained by esterifying 1 mole of a polycyclic alkanedimethanol with 2 moles of a mixture of methacrylic acid and acrylic acid. This ester is sometimes referred to as "meth/acrylate" which means acrylate, methacrylate and/or mixed methacrylate/acrylate.

The polycyclic alkanedimethanols are produced by subjecting the substrate polycyclic alkadiene to hydroxymethylation by, e.g. the oxo synthesis.

The substrate "polycyclic alkadiene", in turn, is produced by the Diels-Alder reaction of cyclopentadiene, whereby the product produced has unsaturation, and the unsaturation is then saturated when the Diels-Alder adduct undergoes the oxo synthesis reaction with Co and $H_2$ in the presence of a Co catalyst.

More particularly, two moles of cyclopentadiene produce a Diels-Alder adduct, which is then subjected to the oxo synthesis reaction to produce tricyclo[$5,2,1,0^{2,6}$]decanedimethanol of the formula (I):

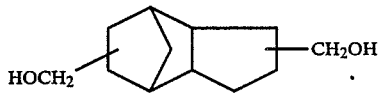

(I)

The Diels-Alder adduct of two moles of cyclopentadiene can undergo further Diels-Alder addition with another mole of cyclopentadiene to a further adduct, namely pentacyclo[$9,2,1,1^{1,8},0^{2,7},0^{9,13}$]pentadecane-4,11-diene and pentacyclo[$9,2,1,1^{4,7}0^{2,10},0^{3,3}$]pentadecane-5,12-diene in admixture as shown in Japanese Patent Laid-Open Nos. 99782/1974 and 100067/1974, which are in turn subjected to the oxo synthesis reaction to produce pentacyclo[$9,2,1,1^{1,8},0^{2,7},0^{9,13}$]pentadecanedimethanol (II) and pentacyclo[$9,2,1,1^{4,7},0^{2,10},0^{3,8}$]pentadecanedimethanol (III) as shown in Japanese Patent Laid-Open No. 140940/1981, respectively the content of the latter being ca. 15%.

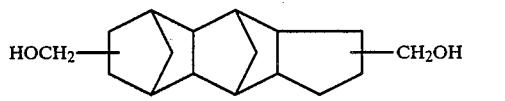

(II)

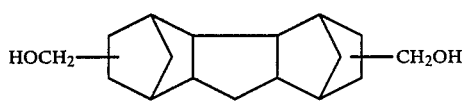

(III)

These compounds such as (I), (II) and (III) are sometimes called herein "the dimethanol".

The dimethanol compound (I), is commercially available under the trade name of "TCD-DM" (supplied from Hoechst A.G.).

The monomers obtained by esterifying this dimethanol compound with a mixture of methacrylic acid and acrylic acid consist of a corresponding methacrylic acid ester, i.e., bismethacrylate, a corresponding acrylic acid ester, i.e., bisacrylate, and a mixed methacrylate/acrylate wherein one of the —$CH_2OH$ groups is esterified with methacrylic acid, and the other —$CH_2OH$ group is esterified with acrylic acid. The ratio of the amounts of these three components varies depending upon the ratio of the methacrylic acid to the acrylic acid in the mixture of these acids as well as the ratio of the bismethanol compound to this mixture. It is desirable, in view of obtaining an optical resin material, that the ratio of the amounts of these raw materials is as described hereinafter (details thereof are described below).

Figure 1:
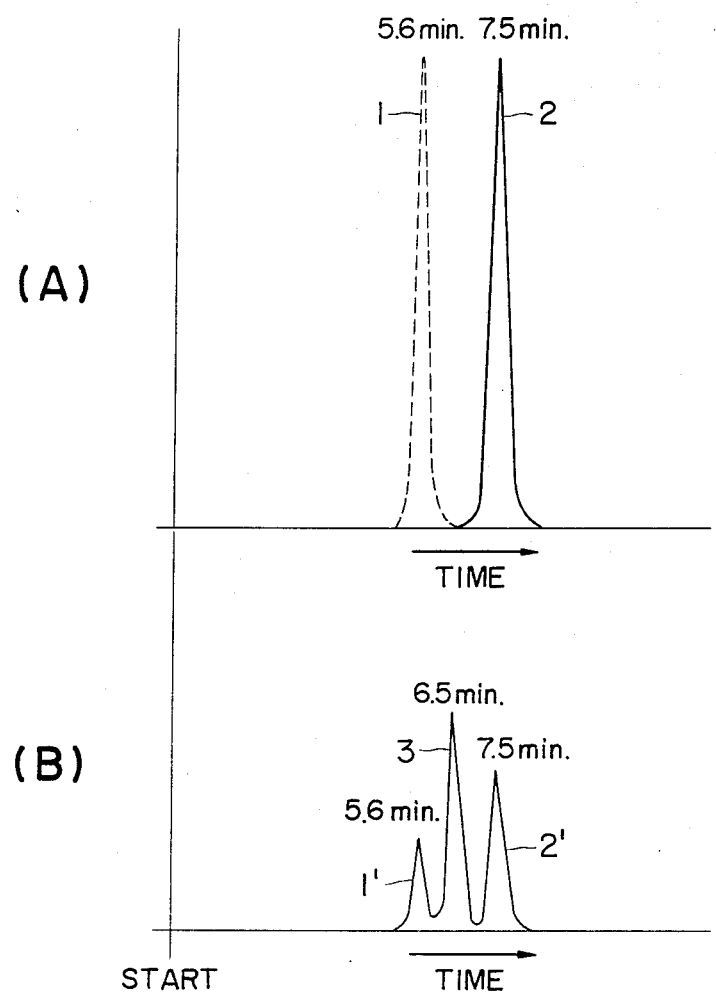
FIG. 1(A) are liquid chromatograms respectively of the decanedimethanol bisacrylate and the bismethacrylate.
FIG. 1(B) is a liquid chromatogram of the meth/acrylate according to the present invention, wherein peaks 1 and 1' correspond to the bisacrylate, peaks 2 and 2' correspond to the bismethacrylate, and peak 3 corresponds to the mixed methacrylate/acrylate.

It is apparent from the results of liquid chromatography and infrared absorption spectra that the product obtained by esterifying the specified dimethanol compound with a mixture of methacrylic acid and acrylic acid is a mixture of three kinds of esters. Namely, FIG. 1(A) shows liquid chromatograms of the tricyclo[$5,2,1,0^{2,6}$]decanedimethanolbismethacrylate (TCDDMA) and the bisacrylate (TCDDA) obtained in the Comparative Examples 1 and 2, respectively, wherein both chromatograms start from the same point. FIG. 1(B) shows a liquid chromatogram of the meth/acrylate obtained in Example 1 according to the present invention, wherein the chromatogram starts from the point corresponding to the starting point in FIG. 1(A). It will be apparent from FIGS. 1(A) and (B), wherein all the chromatograms start at the same time, that the peaks 1' and 2' of the meth/acrylate in FIG. 1(B) correspond to the peak 1 of the bisacrylate (chain line in FIG. 1(A)) and the peak 2 of the bismethacrylate (solid line in FIG. 1(A)), respectively and, thus, that the meth/acrylate includes both the bismethacrylate and the bisacrylate. The peak 3 in FIG. 1(B) corresponds to a mixed methacrylate/acrylate. FIGS. 2 through 4 show infrared absorption spectra of the bismethacrylate (Comparative Example 1), the bisacrylate (Comparative Example 2) and the meth/acrylate (Example 1) according to the present invention, respectively.

Synthesis of the Monomers

The above mentioned monomers are compounds that are obtained by esterifying 1 mole of the above mentioned polycyclic alkanedimethanol with 2 moles of a mixture of methacrylic acid and acrylic acid. The phrase "esterifying 1 mole of the dimethanol with 2 moles of a mixture of methacrylic acid and acrylic acid" merely means that the stoichiometric amount of one of the reactants, a mixture of methacrylic acid and acrylic acid, is 2 moles, and involves (a) using one of the reactants (usually cheaper or more readily removable monomer, which corresponds to a mixture of methacrylic acid and acrylic acid in the present invention) in an excess amount in accordance with conventional methods in a chemical reaction, as well as (b) carrying out the reaction in two stages (for example, at first reacting the dimethanol with methacrylic acid and then adding thereto acrylic acid for further reaction). Moreover, the above mentioned esterification is not restricted to a dehydration reaction wherein both reactant are used in the form of an alcohol and a carboxylic acid, respectively; the esterification involves ester interchange by using one or both of the reactants in the form of a functional derivative such as in the form of a lower alcohol ester to produce the aimed ester.

The esterification can be carried out according to a conventional method under conventional conditions except taking care to inhibit polymerization reaction, since the reactants are specific compounds and the reactants and the product have ethylenically unsaturated bonds.

Thus, 1 mole of the dimethanol compound and approximately 2.0 to 2.6 moles of a mixture of meth/acrylic acid are subjected to an esterification reaction. The molar ratio of the methacrylic acid to the acrylic acid in the meth/acrylic acid mixture is suitably in the range of approximately from 0.25 to 4, preferably approximately from 0.5 to 2.5. The esterification is carried out by charging these materials at the same time in a reaction vessel and adding thereto a reaction solvent which also serves as a dehydrating agent, an esterification catalyst and, as necessary, a polymerization inhibitor to conduct esterification reaction at a reaction temperature of 50° to 200° C., preferably 80° to 150° C. in air or in an inert gas.

The polymerization inhibitors used herein include, for example, phenols such as hydroquinone, hydroquinone monomethylether, etc.; quinones such as benzoquinone, diphenylbenzoquinone, etc.; phenothiazine, copper salts and the like. The amount of the polymerization inhibitor to be used in 0.001 to 10 parts by weight, preferably 0.1 to 5 parts by weight, to 100 parts by weight of the mixture of methacrylic acid and acrylic acid. As a dehydration azeotropic agent, preferably used are n-hexane, n-pentane, cyclohexane, methylcyclohexane, benzene, toluene, xylene, trichloroethylene, tetrachloroethylene, methylchloroform, diisopropylether, etc.

As the esterification catalyst, ordinary esterification catalysts such as sulfuric acid, hydrochloric acid, phosphoric acid, boron fluoride, p-toluenesulfonic acid, benzenesulfonic acid, cation-exchange resins and the like are used.

After termination of the esterification reaction, the reaction liquid is washed with an aqueous alkaline solution and water, then an aqueous layer is separated therefrom, and the dehydration azeotropic agent is removed from an organic layer under reduced pressure.

Resin Materials and Production Thereof

Polymerization

The resin materials according to the present invention are obtained by subjecting the monomers comprising at least a major part thereof of the above mentioned diethylenically unsaturated monomers to radical polymerization.

The phrase "comprising at least a major part thereof the (specified) monomers" means either that the monomers to be subjected to the polymerization consist of the above mentioned specified monomers alone or that other ethylenically unsaturated monomers which are copolymerizable with the specified monomers can be used in combination therewith in a small amount (for example, up to 20% by weight based on the weight of the resulting monomer mixture). The other monomers which can be used in combination with the specified monomers include those which provide transparent polymers, such as styrene, divinyl benzene, lower alkyl esters of methacrylic acid, the compounds represented by the formula: $CH_2=C(R^1)COOR^2OCOC(R^1)=CH_2$ [wherein $R^1$ denotes H or $CH_3$, and $R^2$ denotes a residue obtained by eliminating hydroxyl groups from a dihydric alcohol having 2 to 30 carbon atoms], (cf. Japanese Patent Application No. 131237/85 Specification) and the like. Specific examples thereof include methyl methacrylate, cyclohexyl(meth)acrylate, benzyl(meth)acrylate, neopentylglycol(meth)acrylate, butanediol(meth)acrylate, 4,4'-bis[β-(meth) acryloylethoxy]diphenylpropane, diethyleneglycol bisallylcarbonate, diallyl compounds such as diallylphthalate, and the like. In this connection, the term "(meth)acrylate" in the above specific examples means to include both methacrylate and acrylate.

The resin obtained by copolymerizing some of the above mentioned comonomer with a decanemethanol ester according to the present invention has a relatively low water absorption property. Higher content of such a comonomer tends to produce higher birefringence and lower heat resistance, and therefore the content should not exceed a certain level. Thus, the resin which is the most preferable in the present invention consists of substantially 100% of such decanemethanol esters.

Procedures for radical polymerization are well known, and radical copolymerization can be conducted by, for example, a method which comprises adding to a polymerizable composition a radical initiator such as an organic peroxide, an azo compound or the like and then heating the resulting mixture, or by a method which comprises adding to a polymerizable composition a photosensitizer and irradiating the resulting mixture with ultraviolet light, electron beam, radiation or the like. The radical initiators used therein include, for example, organic peroxides such as benzoyl peroxide, diisopropyl peroxide, tert-butylperoxypivalate, and lauroylperoxide; azo compounds such as azoisobutylonitrile; photosensitizers such as benzophenone, benzoin ethyl ether, benzyl, acetophenone, and anthraquinone; and sulfur compounds such as diphenylsulfite, and thiocarbamate. The amount of the radical initiator is in the range of 0.01 to 20 parts, more preferably 0.01 to 10 parts, to 100 parts of the acrylic compound represented by the foregoing general formula.

The radical copolymerization of the polymerizable composition according to the present invention is preferably conducted in air or in an inert gas at a temperature of from 10° to 150° C. Post curing at ca. 250° C. can be made upon necessity.

Since the monomers which constitute unique features of the invention are diethylenically unsaturated monomers, the resulting polymer is crosslinked and, thus, cannot be molded by a method which is accompanied by melting. Thus, it is preferable to carry out the polymerization by means of a so-called "cast polymerization" to obtain the resulting polymer in the form of plates or blocks.

The resin thus obtained has a light transmission of not less than 85%, birefringence of not more than $1 \times 10^{-5}$, a heat resistance of not lower than 180° C., preferably not lower than 200° C., a thermal stability of not lower than 250° C., and a modulus of elasticity of not less than 300 kg/mm². Here, the term "optical resin materials" used herein means resin materials for optical uses having the above described properties.

EXPERIMENTAL EXAMPLES

In the following examples, quantities expressed in parts and percentages (%) are based on weight. The physical properties obtained in the examples are measured as follows.
(1) Light Transmission: transmission of the light of 500 nm is measured by means of a spectrophotometer.
(2) birefringence: measured by means of a polarizing microscope.
(3) Heat resistance: measured by means of a heat distortion test apparatus according to ASTM-D-648.
(4) Thermal stability: measured by means of a thermogravimetric analytical instrument in air at the rate of 10° C./min.
(5) Bending properties: bending strength and modulus of elasticity are measured according to JIS-K-6911.
(6) Water absorption: measured according to JIS-K-6911.

EXAMPLE 1

A 1-liter four-necked flask equipped with a stirrer, thermometer, nitrogen-inlet tube and water separator was charged with 197 parts of tricyclo[5,2,1,0$^{2,6}$]decanedimethanol, 193 parts of a mixture of methacrylic acid and acrylic acid [the molar ratio of the methacrylic acid to acrylic acid in the mixture (hereinafter, referred to as M/A ratio) was 1.5 and the molar ratio of the dimethanol to the acid mixture was 1/2.4], 200 parts of toluene, 50 parts of p-toluenesulfonic acid, and 0.3 part of copper powder, all at the same time. The reaction mixture reacted at a reaction temperature of 90° to 120° C. for 3 hours while nitrogen gas was caused to overflow. After termination of the reaction, the reaction system was cooled, and excess acid was neutralized with aqueous solution of sodium carbonate. The organic layer was washed three times with pure water, and toluene was distilled away therefrom by means of an evaporator to prepare 340 parts of the objective polymerizable composition having an M/A ratio of 1.5.

To 100 parts of the polymerizable composition was added 0.5 part of benzoylperoxide, and the resulting mixture was heated to 60° C., uniformly mixed under stirring, and then deaerated. The resulting liquid was poured into a mold composed of glass plates of 120-mm diameter and a spacer made of silicone rubber (1,2 mm thickness), and maintained at 60° C. for 24 hours, at 80° C. for 2 hours and at 100° C. for 2 hours for polymerization.

The resulting cured article was taken from the mold to obtain disc plates of 120-mm diameter. Various physical properties of the disc plate were evaluated. The results thereof are shown in Table 1.

EXAMPLES 2 THROUGH 4

Various polymerizable compositions were obtained by repeating the procedure in Example 1 except that, instead of 193 parts of the mixture having an M/A ratio of 1.5 in Example 1, 200 parts of the mixture having an M/A ratio of 4.0, 186 parts of the mixture having an M/A ratio of 0.67, or 180 parts of the mixture having an M/A ratio of 0.25 were used.

The resulting polymerizable compositions were molded into disc plates of 120-mm diameter in the same way as in Example 1. The results of the evaluated physical properties of the disc plates are shown in Table 1.

COMPARATIVE EXAMPLE 1

The procedure of Example 1 was repeated except that 06 parts of methacrylic acid was used instead of the mixture having an M/A ratio of 1.5 to prepare 342 parts of bis(oxymethyl)tricyclo[5,2,1,0$^{2,6}$]decanedimethacrylate.

To 100 parts of the resulting bis(oxymethyl) tricyclo[5,2,1,0$^{2,6}$]decanedimethacrylate was added 0.5 part of benzoyl peroxide. Then, the procedure of Example 1 was repeated to obtain disc plates of 120-mm diameter. The results of evaluated physical properties of the disc boards are shown in Table 1.

COMPARATIVE EXAMPLE 2

The procedure of Example 1 was repeated except that 173 parts of acrylic acid was used instead of 193 parts of the mixture having an M/A ratio of 1.5 to prepare 330 parts of bis(oxymethyl)tricyclo[5,2,1,0$^{2,6}$]decanediacrylate.

To 100 parts of the bis(oxymethyl) tricyclo[5,2,1,0$^{2,6}$]decanediacrylate was added 0.5 part of benzoylperoxide. Then, the procedure of Example 1 was repeated to obtain disc plates of 120-mm diameter.

The results of the evaluated physical properties of the disc plates are shown in Table 1.

COMPARATIVE EXAMPLES 3 AND 4

To 100 parts each of the polymerizable compositions prepared by simply blending the bis(oxymethyl) tricyclo[5,2,1,0$^{2,6}$]decanedimethacrylate and bis(oxymethyl)tricyclo[5,2,1,0$^{2,6}$]decanediacrylate which had been obtained in Comparative Examples 1 and 2, respectively, in the ratio of 60 parts/40 parts and 40 parts/60 parts, respectively, was added 0.5 part of benzoyl peroxide. Then, the procedure of Example 1 was repeated to obtain disc plates of 120-mm diameter.

The results of the evaluated physical properties of the disc plates are shown in Table 1.

EXAMPLES 5 AND 6

To 120 parts of the M/A ratio=1.5 composition obtained in Example 1 was added (a) 30 parts of benzylmethacrylate or (b) 30 parts of divinylbenzene 55% m-, p-divinylbenzene (others m-,p-ethylvinylbenzene etc.) from Aldrich Chemical Company (US) to prepare polymerizable compositions, respectively.

The polymerizable composition was subjected to polymerization under the same conditions as in Example 1 and then molded into disc plates of 120-mm diameter. The results of the evaluated physical properties of the disc plates are shown in Table 1.

TABLE 1

| Monomer component of resin (Numerals in parentheses denote parts by wt.) | Light transmission (%) | Index of double refraction | Heat resistance (°C.) | Thermal stability (°C.) | Bending properties | | Water absorption (%) |
|---|---|---|---|---|---|---|---|
| | | | | | strength Kg/mm$^2$ | modulus of elasticity Kg/mm$^2$ | |
| Exam. 1  M/A ratio = 1.5 composition (100) | 90 | <10$^{-6}$ | 251 | 302 | 7.3 | 400 | 0.20 |
| Exam. 2  M/A ratio = 4.0 composition (100) | 90 | <10$^{-6}$ | >285 | 300 | 8.0 | 410 | 0.20 |
| Exam. 3  M/A ratio = 0.67 composition (100) | 90 | <10$^{-6}$ | 276 | 310 | 8.2 | 400 | 0.20 |

TABLE 1-continued

| | Monomer component of resin (Numerals in parentheses denote parts by wt.) | Light transmission (%) | Index of double refraction | Heat resistance (°C.) | Thermal stability (°C.) | Bending properties strength Kg/mm$^2$ | Bending properties modulus of elasticity Kg/mm$^2$ | Water absorption (%) |
|---|---|---|---|---|---|---|---|---|
| Exam. 4 | M/A ratio = 0.25 composition (100) | 90 | $<10^{-6}$ | 216 | 310 | 7.1 | 420 | 0.21 |
| Exam. 5 | M/A ratio = 1.5 composition/ benzyl methacrylate (80/20) | 91 | $<10^{-6}$ | 194 | 302 | 7.3 | 390 | 0.16 |
| Exam. 6 | M/A ratio = 1.5 composition/ divinyl benzene (80/20) | 90 | $<10^{-6}$ | >250 | 291 | 10.3 | 400 | 0.14 |
| Comp. Exam. 1 | TCDDMA (100) | 90 | $4.5 \times 10^{-6}$ | 273 | 240 | 4.5 | 400 | 0.20 |
| Comp. Exam. 2 | TCDDA (100) | 91 | $3.2 \times 10^{-6}$ | 155 | 310 | 7.8 | 241 | 0.21 |
| Comp. Exam. 3 | TCDDMA/TCDDA (60/40) | 90 | $4.2 \times 10^{-6}$ | 172 | 300 | 6.8 | 270 | 0.20 |
| Comp. Exam. 4 | TCDDMA/TCDDA (40/60) | 90 | $4.0 \times 10^{-6}$ | 153 | 310 | 7.7 | 250 | 0.20 |

Note:
The abbreviations in the column of resin composition have the following meanings. TCDDMA: bis(oxymethyl)tricyclo[5,2,1,0$^{2,6}$]decanedimethacrylate; TCDDA: bis(oxymethyl)tricyclo[5,2,1,0$^{2,6}$]decanediacrylate; M: methacrylic acid; A: acrylic acid.

EXAMPLE 7

The procedure of Example 1 was repeated except that 1 mol(265 parts) of pentacyclopentadecanedimethanol (obtained by reacting a cyclopentadiene trimer having a pentacyclo [9,2,1,1$^{1,8}$,0$^{2,7}$,0$^{9,13}$]pentadecane-4, 11-diene/pentacyclo [9,2,1,1$^{4,7}$,0$^{2,10}$,0$^{3,8}$]pentadecane-5,12-diene ratio of 86/14 was used instead of the tricyclo[5,2,1,0$^{2,6}$]decanedimethanol to prepare 380 parts of the objective polymerizable composition having an M/A ratio of 1.5, the resulting polymerizable compositions were molded into disc plates of 120-mm diameter in the same way as in Example 1.

The result of the evaluated physical properties of the disc plate are shown below.

| | |
|---|---|
| Light Transmission | 90% |
| birefringenece | $<10^{-5}$ |
| Heat resistance | 202° C. |
| Thermal Stability | 305° C. |
| Bending properties strength | 8.2 kg/cm$^2$ |
| modulus of elasticity | 440 kg/cm$^2$ |
| Water absorption | 0.15% |
| Saturated Water absorption (soaking in 60° C. water) | 0.69% |

What is claimed is:

1. An optical disc made of a resin having a light transmission of not less than 85%, a birefringence of not more than $1 \times 10^{-5}$, a heat resistance of not lower than 180° C., a thermal stability of not lower than 250° C., and a modulus of elasticity of no less than 300 kg mm$^{-2}$, wherein said resin consists essentially of radical polymerization polymer of an ethylenically unsaturated monomer, characterized in that at least a major part of the ethylenically unsaturated monomer is an ester of 1 mole of tricyclo[5.2.1.0$^{2,6}$]decanedimethanol with 2 moles of a mixture of acrylic acid and methacrylic acid.

2. The disc according to claim 1, in which the ester is obtained by esterifying 1 mole of tricyclo[5.2.1.0$^{2,6}$]decanedimethanol with from 2.0 to 2.6 mole of a mixture of acrylic acid and methacrylic acid wherein the molar ratio of methacrylic acid/acrylic acid is from 0.25 to 4.

3. The disc according to claim 1, in which said ester comprises substantially the whole amount of the ethylenically unsubstantially monomer.

4. The disc according to claim 1, in which said ester comprises not less than 80% by weight of the ethylenically unsaturated monomer.

5. The disc according to claim 4, in which the remaining amount of the ethylenically unsaturated monomer is a monomer which is copolymerizable with the ester and which can be homopolymerized into a transparent homopolymer.

6. The disc according to claim 5, in which the copolymerizable monomer is styrene or a C$_{1-6}$ alkyl ester of (meth)acrylic acid.

7. The disc according to claim 5, in which the copolymerizable monomer is a compound represented by CH$_2$=C(R$^1$)COOR$_2$OCOC(R$^1$)=CH$_2$ wherein R$^1$ is H or CH$_3$ and R$^2$ is a residue obtained by removing hydroxyl groups from a dihydric alcohol having 2 to 30 carbon atoms.

8. The disc according to claim 5, in which the copolymerizable monomer is a diallyl compound.

9. An optical disc made of a resin having a light transmission of not less than 85%, a birefringence of not more than $1 \times 10^{-5}$, a thermal stability of not lower than 250° C. a heat resistance of not lower than 250° C., and a modulus of elasticity of not less than 300 kg mm$^{-2}$, wherein said resin consists essentially of a radical polymerization polymer of an ethylenically unsaturated monomer, characterized in that at least a major portion of the ethylenically unsaturated monomer is an ester of 1 mole of a polycyclic alkanedimethanol in which at least 3 moles of cyclopentadiene have been added by a Diels-Alder reaction with 2 moles of a mixture of acrylic acid and methacrylic acid.

10. The disc of claim 9, in which the polycyclic alkanedimethanol is selected from the group consisting of pentacyclo[9.2.1.1$^{1,8}$.0$^{2,7}$.0$^{9,13}$]pentadecanedimethanol, pentacyclo[9.2.1.1$^{4,7}$.0$^{2,10}$.0$^{3,8}$]pentadecanedimethanol and mixture thereof.

11. In an optical disc made of a resin, the improvement comprising using a resin having a light transmission of not less than 85%, a birefringence of not more than $1 \times 10^{-5}$, a heat resistance of not lower than 180° C., a thermostability of not lower than 250° C., and a modulus of elasticity of not less than 300 kg mm$^{-2}$, wherein said resin consists essentially of a radical polymerization polymer of an ethylenically unsaturated monomer, characterized in that at least a major part of the ethylenically unsaturated monomer is an ester of 1 mole of tricyclo[5.2.1.0$^{2,6}$]decanedimethanol with 2 moles of a mixture of acrylic acid and methacrylic acid.

12. A method for manufacturing an optical disc, comprising fabricating a resin into an optical disc, wherein said resin has a light transmission of not less than 85%, a birefringence of not more than $1 \times 10^{-5}$, a heat resistance of not lower than 180° C., a thermal stability of not lower than 250° C., and a modulus of elasticity of not less than 300 kg mm$^{-2}$, and said resin consists essentially of a radical polymerization polymer of an ethylenically unsaturated monomer, characterized in that at least a major part of the ethylenically unsaturated monomer is an ester of 1 mole of tricyclo[5.2.1.0$^{2,6}$]decanedimethanol with 2 moles of a mixture of acrylic acid and methacrylic acid.

13. The method according to claim 12, in which the ester is obtained by esterifying 1 mole of tricyclo[5.2.1.0$^{2,6}$]decanedimethanol with from 2.0 to 2.6 mole of a mixture of acrylic acid and methacrylic acid wherein the molar ratio of methacrylic acid/acrylic acid is from 0.25 to 4.

14. The method according to claim 12, in which the ester comprises substantially the whole amount of the ethylenically unsaturated monomer.

15. The method according to claim 12, in which the ester comprises not less than 80% by weight of the ethylenically unsaturated monomer.

16. The method according to claim 15, in which the remaining amount of the ethylenically unsaturated monomer is a monomer which is copolymerizable with the ester and which can be homopolymerized into a transparent homopolymer.

17. The method according to claim 16, in which the copolymerizable monomer is styrene or a $C_{1-6}$ alkyl ester of (meth)acrylic acid.

18. The method according to claim 16, in which the copolymerizable monomer is a compound represented by $CH_2=C(R^1)COOR^2OCOC(R^1)=CH_2$ wherein $R^1$ is H or $CH_3$ and $R^2$ is a residue obtained by removing hydroxyl groups from a dihydric alcohol having 2 to 30 carbon atoms.

19. The method according to claim 16, in which the copolymerizable monomer is a diallyl compound.

20. A method for manufacturing an optical disc, comprising fabricating a resin into an optical disc, wherein said resin has a light transmission of not less than 85%, a birefringence of not more than $1 \times 10^{-5}$, a heat resistance of not lower than 180° C., a thermal stability of not lower than 250°, and a modulus of elasticity of not less than 300 kg mm$^{-2}$, said resin consisting essentially of a radical polymerization polymer of an ethylenically unsaturated monomer, characterized in that at least a major portion of the ethylenically unsaturated monomer is an ester of 1 mole of a polycyclic alkanedimethanol in which at least 3 moles of cyclopentadiene have been added by a Diels-Alder reaction with 2 moles of a mixture of acrylic acid and methacrylic acid.

21. The method according to claim 20, in which the polycyclic alkanedimethanol is selected from the group consisting of pentacyclo[9.2.1.1$^{1,8}$.0$^{2,7}$.0$^{9,13}$]pentadecanedimethanol, pentacyclo[9.2.1.1$^{4,7}$.0$^{2,10}$.0$^{3,8}$]pentadecanedimethanol and mixture thereof.

* * * * *